Dec. 31, 1957  B. J. BOWLING  2,818,094
COMBINATION MULTIPLE SAW AND CUTTING HEAD
Filed March 12, 1956  2 Sheets-Sheet 1

Bury J. Bowling
INVENTOR.

BY Loyal J. Miller
ATTORNEY

Dec. 31, 1957  B. J. BOWLING  2,818,094
COMBINATION MULTIPLE SAW AND CUTTING HEAD
Filed March 12, 1956  2 Sheets-Sheet 2

Bury J. Bowling
INVENTOR.

BY
ATTORNEY

United States Patent Office 2,818,094
Patented Dec. 31, 1957

2,818,094

COMBINATION MULTIPLE SAW AND CUTTING HEAD

Bury J. Bowling, Oklahoma City, Okla.

Application March 12, 1956, Serial No. 570,765

4 Claims. (Cl. 144—236)

The present invention relates to the wood working industry, and more particularly to a tool or cutting head by which a wood moulding machine may simultaneously cut a plurality of quarter-round strips from a single piece of board stock.

It is conventional practice to rip boards into narrow strips and then run these narrow strips through the moulding machine to obtain quarter-round moulding. This practice works very well, but is wasteful of lumber in many instances and takes considerable time, since only one piece of moulding is produced from the machine at a time.

It is therefore the principal object of this invention to provide a multiple saw and cutting head arrangement for connection with any standard wood moulding machine which will form a plurality of strips of quarter-round moulding from a single piece of board of a selected standard width with no appreciable waste of lumber other than the sawdust and shavings.

Another object is to provide a cutting head of this class, the capacity of which may be easily increased or diminished to equal the standard width of board stock and thereby utilize substantially all of each piece of stock.

Another object is to provide a cutting head from which the cutting knives may be removed for sharpening.

An additional object is to provide a cutter of this class which is simply and sturdily constructed and therefore has a comparatively long working life.

A further object is to provide a cutter of this character which will improve standard wood moulding machines so as to secure the utmost rapidity of operation in forming mouldings.

The present invention accomplishes these and other objects by providing an arbor having a plurality of substantially elliptical shaped members clamped thereon. Each of the members is provided with a cutting knife or edge on each end of the major axis of the member. The cutting knife has arcuate or concave cutting edges converging outwardly and terminating in a central tip at the end of the major axis of each respective member. The length of the cutting edge is sufficient to extend the central tip through the thickness of the board stock being formed. A circular saw having a diameter at least as great as the length of the major axis of each member is clamped between adjacent sides of the members to rip the board stock. The arbor is carried by the bottom profile head of a wood moulding machine of a standard make, preferably having adjustable fences and holddowns, to guide the stock in perfect registry through the machine.

The present invention further comprises a relatively small tool which may be connected to a comparatively inexpensive wood moulding machine which will enable this machine to cut a plurality of strips of moulding from a single piece of board. This is accomplished by the present invention by using a piece of board substantially equal in thickness with relation to the finished thickness of the moulded strip. This is in contrast with the larger more expensive wood moulding machines wherein cutters are carried by opposing side heads which form opposite sides of a comparatively thick piece of stock which is thereafter divided or sawed by a back saw to separate the strips of mouldings.

Other objects will be apparent from the following description when taken in conjunction with the accompanying two sheets of drawings, wherein.

Like characters of reference designate like parts in those figures of the drawings in which they occur.

In the drawings.

Figure 4:
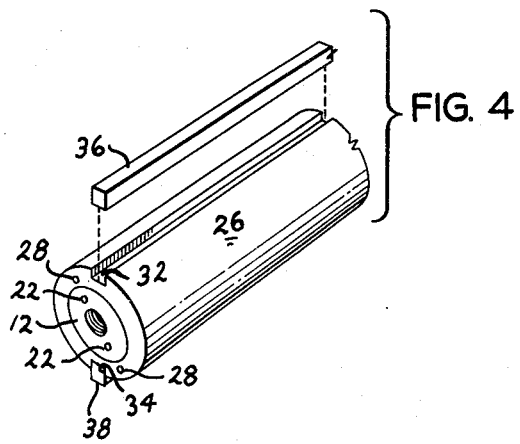
Figure 4 is a partially exploded fragmentary perspective view of the free end of the arbor and cutter-carrying sleeve.

The reference numeral 10 indicates, as a whole, the device comprising a head or arbor 12 having one cylindrical end 14 adapted to be gripped by the chuck of the bottom profile head of a wood moulding machine. The arbor 12 is provided with an annular shoulder 16 intermediate its ends. The free end of the arbor 12 is perpendicular to its longitudinal axis and has a circular clamp plate 18 rigidly held flatly thereagainst by a stud bolt 20. Diametrically, the plate is substantially larger than the arbor, for the reasons which will presently be apparent. The free end of the arbor 12 is provided with a pair of indentations or recesses, as at 22, Fig. 4, for receiving a co-operating pair of lugs 24 formed on the inwardly disposed side of the plate 18 to insure rotation of the plate 18 with the arbor 12.

A cylindrical sleeve 26 having a bore closely received by the arbor 12 is clamped thereon between the shoulder 16 and the plate 18. The end of the sleeve adjacent the plate is similarly provided with a pair of recesses 28 for receiving a pair of co-operating lugs 30 formed on the inwardly disposed side of the plate 18. Thus, the plate 18 and the lugs 24 and 30, disposed within their respective recesses, rigidly grip the sleeve 26 for rotation with the arbor 12. The periphery of the sleeve 26 is provided with a pair of oppositely disposed longitudinally extending grooves, as at 32 and 34, for receiving keys 36 and 38, respectively.

Figure 3:
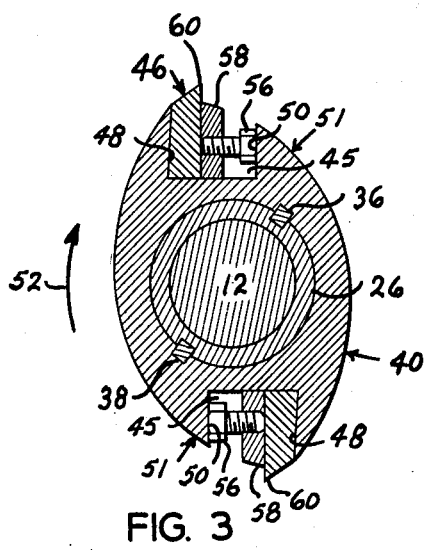
Figure 3 is a vertical cross sectional view taken substantially along line 3—3 of Fig. 2.

A plurality of substantially elliptical shaped cutting members 40 are mounted on the sleeve 26. Each member 40 has opposing sides 42 and 44 parallel with relation to its major axis and is centrally bored perpendicular to the sides to be closely received by the periphery of the sleeve 26. The bores of the cutting members 40 are alignedly slotted for receiving the keys 36 and 38. At the ends of its major axis each member 40 is transversely slotted, as at 45, a selected depth for removably receiving a cutting knife 46. The slot 45 is preferably formed with one of its walls beveled, as at 48, to widen the slot adjacent its bottom, for reasons which will presently be apparent. A portion of the body of each member 40 adjacent the side 50 of the slot is arcuately ground away, as at 51, to leave the beveled side 48 of the slot projecting circumferentially beyond the side 50 as the member is rotated in the direction shown by the arrow 52, Fig. 3. Adjacent the ends of its major axis each of the sides of the slot wall 48 is formed with co-operating arcuate concave edges 54 which converge outwardly to form a central tip 56. Each cutting knife 46 is held within the slot 45 adjacent the beveled wall 48 by a bolt 56 and lock plate 58. Each knife 46 is substantially as long as the transverse width of each member 40. The outwardly disposed side of each knife is similarly provided with co-operating arcuate cutting edges terminating in a central tip 60 which overlap or extend outwardly beyond the edges 54 and tip 56 of the body of the member 40. The depth or distance circumscribed by each arcuate cutting edge of the knives is preferably one-fourth the circumference of a circle and great enough to allow the tip 60 to penetrate through the thickness of wood stock to be cut. A conventional circular saw 62 is flatly clamped between the adjoining sides 42 and 44 of each two members 40 and is keyed to the sleeve 26 for rotation with the same. Diametrically the saws 62 are preferably slightly greater than the length of the major axis of the members 40.

Figure 1:
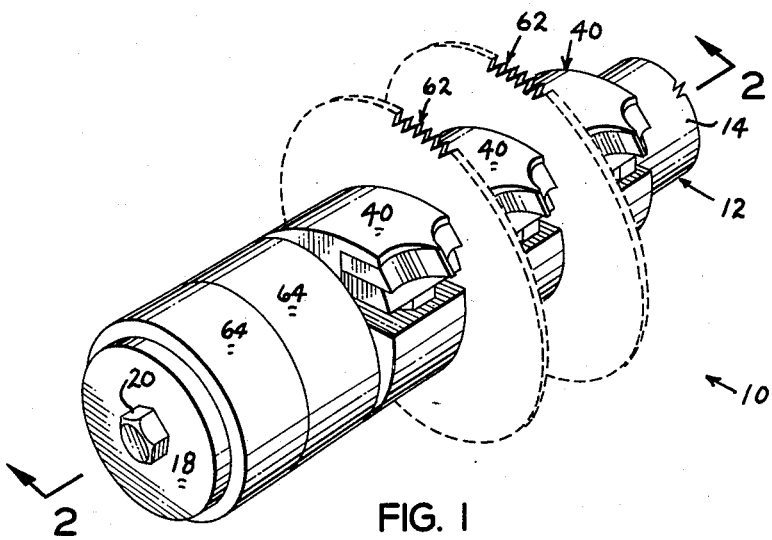
Figure 1 is a perspective view of the device.
Figure 2:
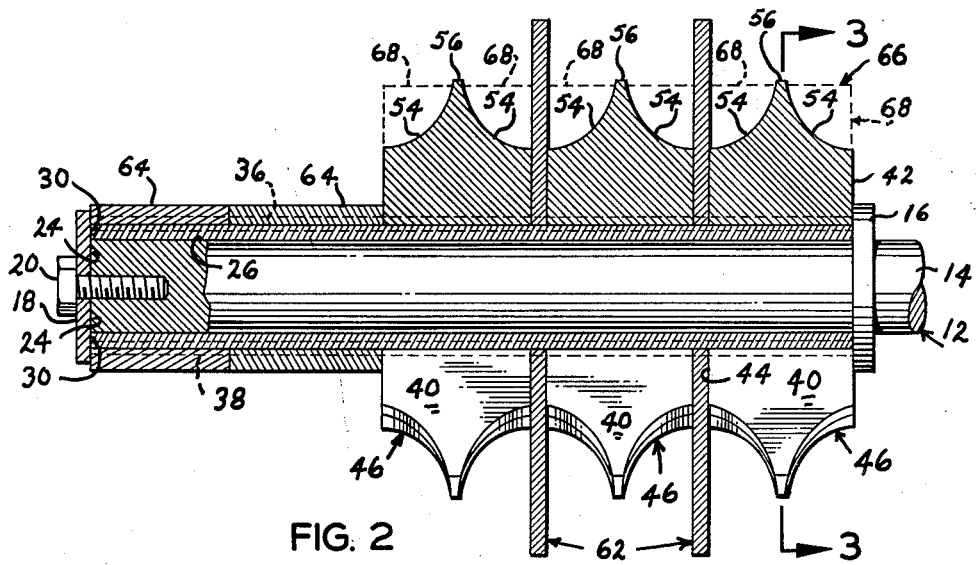
Figure 2 is a vertical cross sectional view, partly in elevation, taken substantially along line 2—2 of Fig. 1.

In the embodiment illustrated in the drawings, three of the members 40 are clamped on the arbor 12 with two saws 62 therebetween. The arbor 12 is preferably made long enough to support more of the members 40 and saws 62 when it is desired to form moulding from wider stock. Spacers 64 are positioned between the members 40 and the clamping plate 18, as shown in Figs. 1 and 2, when the full length of the arbor is not used.

Operation

The end 14 of the arbor is connected to the bottom profile head of a conventional wood moulding machine, not shown. The width of the cutting members 40 and the saws 62 are substantially equal with relation to the transverse width of a selected standard board stock 66, in this instance, a 1 x 4. The board 66 is run through the machine and is arcuately formed on its under side into six quarter-rounds 68 (Fig. 2) by means of the arcuate cutting edges of the knives 46 as the tips 60 penetrate through the board while the saws 62 simultaneously rip or separate the two pairs of quarter-round strips not separated by the knives. Each knife 46 may be removed from the slot 45 for sharpening or replacement by loosening the bolt 56.

It is to be understood that, while the drawings have illustrated and the above description details the cutting of quarter-round strips, the shape of the strips formed from a piece of stock may be varied as desired by simply replacing knives 46 with knives having the desired profile for other shapes.

Obviously the invention is susceptible to some change or alteration without defeating its practicability, and I therefore do not wish to be confined to the preferred embodiment shown in the drawings and described herein, further than I am limited by the scope of the appended claims.

I claim.

1. A cutter for dividing a single length of stock into a plurality of quarter-round strips, including: an arbor having an annular shoulder intermediate its ends; a clamping plate bolted to the free end of said arbor; a cylindrical sleeve clamped around said arbor between said plate and said shoulder for rotation with the arbor, said sleeve having at least one longitudinally extending key-way in its periphery; a plurality of substantially elliptical members having opposing sides parallel to their major axis and having a central bore perpendicular to their sides, said members being keyed to said sleeve and clamped between said plate and said shoulder, said members each having a transverse cutting-knife receiving slot in each end of their major axis; a cutting knife removably carried by each slot of each said member, respectively, each said knife having concave cutting edges substantially describing one-fourth of the arc of a circle and converging outwardly from the bore of said members and terminating in a central tip aligned with the major axis of each said member, respectively, the length of the arc of each of said cutting edges being at least equal to the thickness of said stock; and a circular saw keyed to said sleeve and flatly clamped between the adjacent sides of each of said members, respectively, the diameter of said saws being at least as great as the length of the major axis of each of said members.

2. A cutter for dividing a single length of stock into a plurality of moulding strips, including: an arbor having an annular shoulder intermediate its ends; a clamping plate bolted to the free end of said arbor; a cylindrical sleeve clamped around said arbor between said plate and said shoulder for rotation with the arbor; a plurality of substantially elliptical members having opposing sides parallel to their major axis and having a central bore perpendicular to their sides, said members being keyed to said sleeve and clamped between said plate and said shoulder, said members each having oppositely disposed pairs of arcuate cutting edges converging outwardly from the bore of said members and terminating in a central tip on their respective major axis, the length of said cutting edges being at least equal to the thickness of said stock; and a circular saw keyed to said sleeve and flatly clamped between the adjacent sides of each of said members, respectively, the diameter of said saws being at least as great as the length of the major axis of each of said members.

3. Structure as specified in claim 2, in which each of the cutting edges are concave.

4. Structure as specified in claim 3, in which the concave arc of each cutting edge substantially equals one-quarter of the circumference of a circle.

References Cited in the file of this patent

UNITED STATES PATENTS

| 9,515 | Dale | Jan. 4, 1853 |
| 192,858 | Bostwick | July 10, 1877 |
| 783,946 | Gregory | Feb. 28, 1905 |
| 817,568 | Huther | Apr. 10, 1906 |
| 999,014 | DeLaney | July 25, 1911 |

FOREIGN PATENTS

| 49,372 | Germany | Oct. 26, 1889 |